United States Patent
Geopfert (10) Patent No.: US 6,617,503 B2
(45) Date of Patent: Sep. 9, 2003

(54) VOCAL TRAINING DEVICE

(76) Inventor: Joseph W. Geopfert, 1961 Marhofer Ave., Stow, OH (US) 44224

(*) Notice: Subject to any disclaimer, the term of this patent is extended or adjusted under 35 U.S.C. 154(b) by 0 days.

(21) Appl. No.: 09/943,472

(22) Filed: Aug. 30, 2001

(65) Prior Publication Data

US 2003/0041720 A1 Mar. 6, 2003

(51) Int. Cl.$^7$ ................................................ G10G 3/00
(52) U.S. Cl. ........................................ 84/461; 84/470 R
(58) Field of Search ...................... 84/461, 466, 470 R; 434/318

(56) References Cited

U.S. PATENT DOCUMENTS

| | | | | |
|---|---|---|---|---|
| 3,584,530 A | * | 6/1971 | Andersen | 84/470 R |
| 3,634,596 A | * | 1/1972 | Rupert | 360/12 |
| 3,955,466 A | * | 5/1976 | Goldmark | 360/74.4 |
| 4,169,335 A | | 10/1979 | Betancourt | |
| 4,321,853 A | | 3/1982 | Tumblin | |
| 4,441,399 A | * | 4/1984 | Wiggins et al. | 84/470 R |
| 4,828,527 A | | 5/1989 | Spector | |
| 4,840,602 A | | 6/1989 | Rose | |
| 4,857,030 A | | 8/1989 | Rose | |
| 4,949,327 A | | 8/1990 | Forsse et al. | |
| 5,052,264 A | * | 10/1991 | Dueweke | 84/470 P |
| 5,096,451 A | | 3/1992 | Smith et al. | |
| 5,281,143 A | | 1/1994 | Arad et al. | |
| 5,287,789 A | | 2/1994 | Zimmerman | |
| 5,376,038 A | | 12/1994 | Arad et al. | |
| 5,438,154 A | | 8/1995 | Segan et al. | |
| 5,439,382 A | * | 8/1995 | Pettinichi | 434/319 |
| 5,518,408 A | * | 5/1996 | Kawashima et al. | 434/307 A |
| 5,525,062 A | * | 6/1996 | Ogawa et al. | 386/96 |
| 5,540,132 A | | 7/1996 | Hale | |
| 5,563,358 A | | 10/1996 | Zimmerman | |
| 5,603,652 A | | 2/1997 | Rothschild et al. | |
| 5,636,994 A | | 6/1997 | Tong | |
| 5,655,945 A | | 8/1997 | Jani | |
| 5,820,440 A | | 10/1998 | Truchsess | |
| 5,855,483 A | | 1/1999 | Collins et al. | |
| 5,897,421 A | | 4/1999 | Rink et al. | |
| 5,906,494 A | * | 5/1999 | Ogawa et al. | 434/307 A |
| 5,944,533 A | | 8/1999 | Wood | |
| 6,000,987 A | | 12/1999 | Belin et al. | |
| 6,057,501 A | | 5/2000 | Hale | |
| 6,135,845 A | | 10/2000 | Klimpert et al. | |
| 6,160,986 A | | 12/2000 | Gabai et al. | |
| 6,183,337 B1 | | 2/2001 | Beckman et al. | |
| 6,414,229 B1 | * | 7/2002 | Gaudet | 84/465 |

FOREIGN PATENT DOCUMENTS

JP          4-322686         11/1992

* cited by examiner

*Primary Examiner*—Jeffrey Donels
(74) *Attorney, Agent, or Firm*—Hahn Loeser & Parks LLP; Michael H. Minns (57) ABSTRACT

The present invention relates to a system for playing back, via a plurality of speakers, the melody, harmony, and the harmony's components which comprise a song. Specifically, the present invention allows the user to select a song from a plurality of songs that have been formatted to allow playback of individual melody and/or harmony or the harmony's sub-components. Additionally, the present invention allows the user to select a desired playback mode which includes: melody only, harmony only, melody and harmony, multi-unit playback of melody, harmony and harmony's components.

13 Claims, 4 Drawing Sheets

VOCAL TRAINING DEVICE

TECHNICAL FIELD

The present invention relates generally to an apparatus for teaching individuals musical harmony and how to vocally reproduce the harmony and/or melody of a prerecorded/preformatted song. Specifically, the present invention involves the use of a single unit or multiple units to playback the harmony component and/or the melody component (and/or sub-components) of a preselected song. As a result, the user of the present invention is able to listen and more effectively discern the discrete harmony and/or melody components of a song, thereby serving as an entertaining device and/or training a user to sing the song's harmony and/or melody.

BACKGROUND OF THE INVENTION

Learning or teaching another how to vocally reproduce or sing the harmony and/or melody of a song can be a tedious and time consuming undertaking, generally requiring the expense of a voice coach or singing instructor. Furthermore, without costly equipment, an untrained listener would likely have difficulty separating a song's harmony and/or melody from a tune heard over the radio, stereo, or any other mode of audio playback. A standard song comprises a melody, which typically contains the words of the song as expressed through a singer's voice, and one or more harmony parts that are comprised of an accompanying singing voice or a plurality of singing voices. Additionally, the harmony of a song may be further classified into sub-classifications based upon the pitch of the singer's voice that include: soprano, alto, tenor, bass. Furthermore, it is also widely known in the art of music that these harmony sub-classifications can be further defined by additional sub-classifications, such as baritone and contralto.

More specifically, the harmony of a song is based on the sound and interrelationship between various pitches of a plurality of voices as they sound when they are simultaneously sung (played) together. Further, harmony is comprised of a plurality of sub-categories corresponding to the pitch of a person's voice with respect to that of another person's voice. A soprano in general is the highest human voice, however other levels of voice exist. Generally, an alto voice is the lowest of the female voices and is the voice range found between the soprano voice, and the tenor voice. The tenor voice is typically the highest normal register of a male. Finally, the lowest register of a human voice is the bass, and is typically sung by a male.

The melody, on the other hand is generally regarded as being the "tune" of a piece of music. Additionally, a melody is created when pitches or notes of a song are structured in succession with each other so as to make an integrated whole.

At present, there are no simple and effective methods or products for facilitating a greater understanding of melody and harmony characteristics and/or to facilitate teaching of these relationships.

Therefore, in light of the foregoing deficiencies in the prior art, the applicant's invention is herein presented.

SUMMARY OF THE INVENTION

It is an object of the present invention, or vocal training device, to facilitate an individual's ability to learn how to vocally reproduce the harmony and/or melody of a prerecorded song. It is an additional object of the present invention to provide a system to allow the user to better understand how the melody and harmony components of a song interact and complement each other. A further objective of the present invention is to provide a system that is simple and cost effective, and appealing to the user. One embodiment of the present invention is comprised of a housing, an electrical circuit for playing back a stored predetermined melody or harmony of a song, a playback mode selector switch, a song selection switch, and a plurality of speakers. The housing may be of any configuration, and in one embodiment may be suitable for use by children, such as being doll-like in form. Any other housing or configuration suitable for enclosing an electrical circuit may be used. To initiate playback of a song, the user actuates a selector switch to select a desired song stored in the electrical circuit's memory for playback. These songs are preformatted so that the melody, harmony and harmony's associated sub-components including: soprano, alto, tenor, and bass, etc. can be played back as separate, discrete channels via individually dedicated speakers. Next, the user actuates a playback mode selector switch to initiate the unit's playback options which may comprise the following: playback of the melody and harmony simultaneously, playback of the melody only, playback of the harmony only, or playback of the melody and harmony through separate interacting training units respectively.

Additionally, the present invention may include a system for coupling a plurality of vocal training units together via a connecting system. In an embodiment of the present invention, the training units can be physically linked together or linked wirelessly via a transmitter/receiver system located in each training unit. By linking a plurality of vocal training devices together, the present invention will allow the user to playback the melody, harmony, or specific sub-components of the harmony (soprano, alto, tenor, bass) separately through individual speakers located within each of the connected vocal training devices.

DETAILED DESCRIPTION

Figure 1:
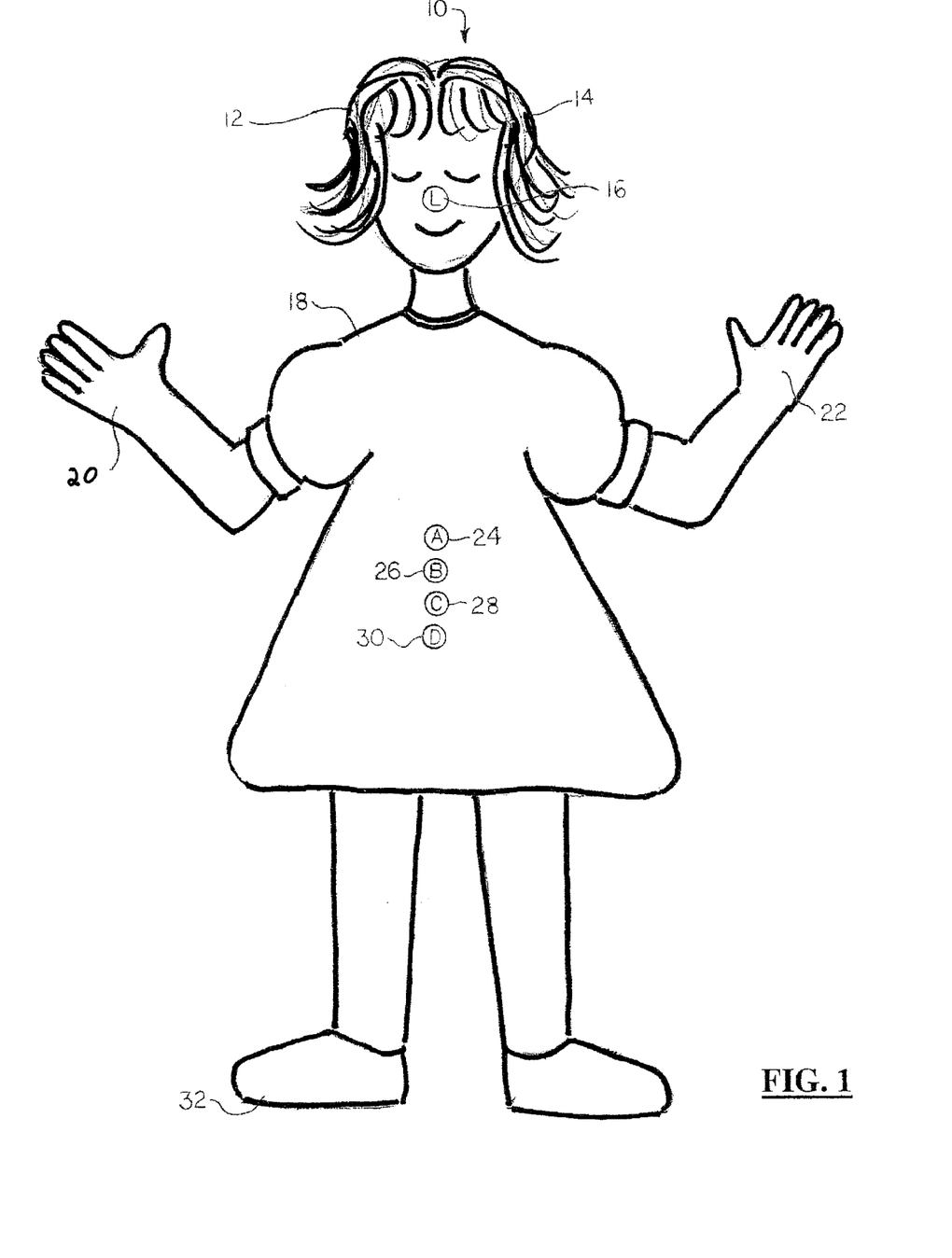
FIG. 1 is a front elevational view of the enclosure of the vocal training device in the form of a doll-shaped figure.

The present invention 10, or vocal training device 10 is described in FIG. 1. In a configuration, the vocal training device 10 is comprised of a housing 18 in the form of a doll-like figure. However, this shape is not necessary for the function of the present invention 10, and any structure suitable for housing an electrical circuit can be used. This or like shapes may be more aesthetically pleasing for certain users, such as children. The present invention 10 is comprised of a plurality of speakers 12,14 with each individual speaker dedicated to playing back either the harmony and/or melody of a song. It is also contemplated that additional speakers may be added to allow discrete playback of the sub-components (soprano, alto, tenor, bass) of the harmony via individually dedicated speakers. By having separate speakers for each component of the harmony and melody, the present invention 10 allows the user to more easily discern the harmony and/or melody of a song. A switch 16 allows the user to activate and deactivate the vocal training device 10. To select a desired playback mode, the user must select a corresponding selection button 24, 26, 28, and 30. Additionally, it is contemplated that a variety of switching devices or switching configurations known in the art may be used to select a playback mode or to deactivate/activate the present invention 10. By selecting one of the buttons, 24, 26, 28, and 30 the present invention 10 will playback the melody and/or harmony in one of the following possible playback configurations: the melody only, the harmony only, the harmony and melody combined, and playback where the harmony is played through a first voice training device 10 and the melody is played back through a second voice training device 10 that is connected to the first voice training device 10. It is also contemplated that other possible playback configurations can be adopted, such as having the harmony's sub-components (soprano, alto, tenor, bass, etc . . .) individually selected for playback as well. A plurality of connectors 20,22 widely known in the art are situated on the palms of the doll's hands, and allow the user of the present invention 10 to link the circuits of additional voice training devices 10 together. Additionally, these connectors 20,22 could be located in any position on the training device that is suitable for linking a plurality of training devices 10 together. By connecting additional circuits, the present invention 10 is capable of playing back the melody and the harmony, the harmony's components (soprano, alto, tenor, bass) or other harmonic or melodic parts on separate voice training units 10. By having the melody play from one voice training unit 10, and the harmony playing from a second voice training unit 10 connected through connectors 20, 22, the user is able to easier identify the separate musical parts, but it may be possible to play back multiple parts on the plurality of units 10. Finally, the present invention operates using the power of a battery 60 stored in the battery enclosure 34, however it is also contemplated that any external AC/DC power source may be used to operate the present invention 10.

Figure 2:
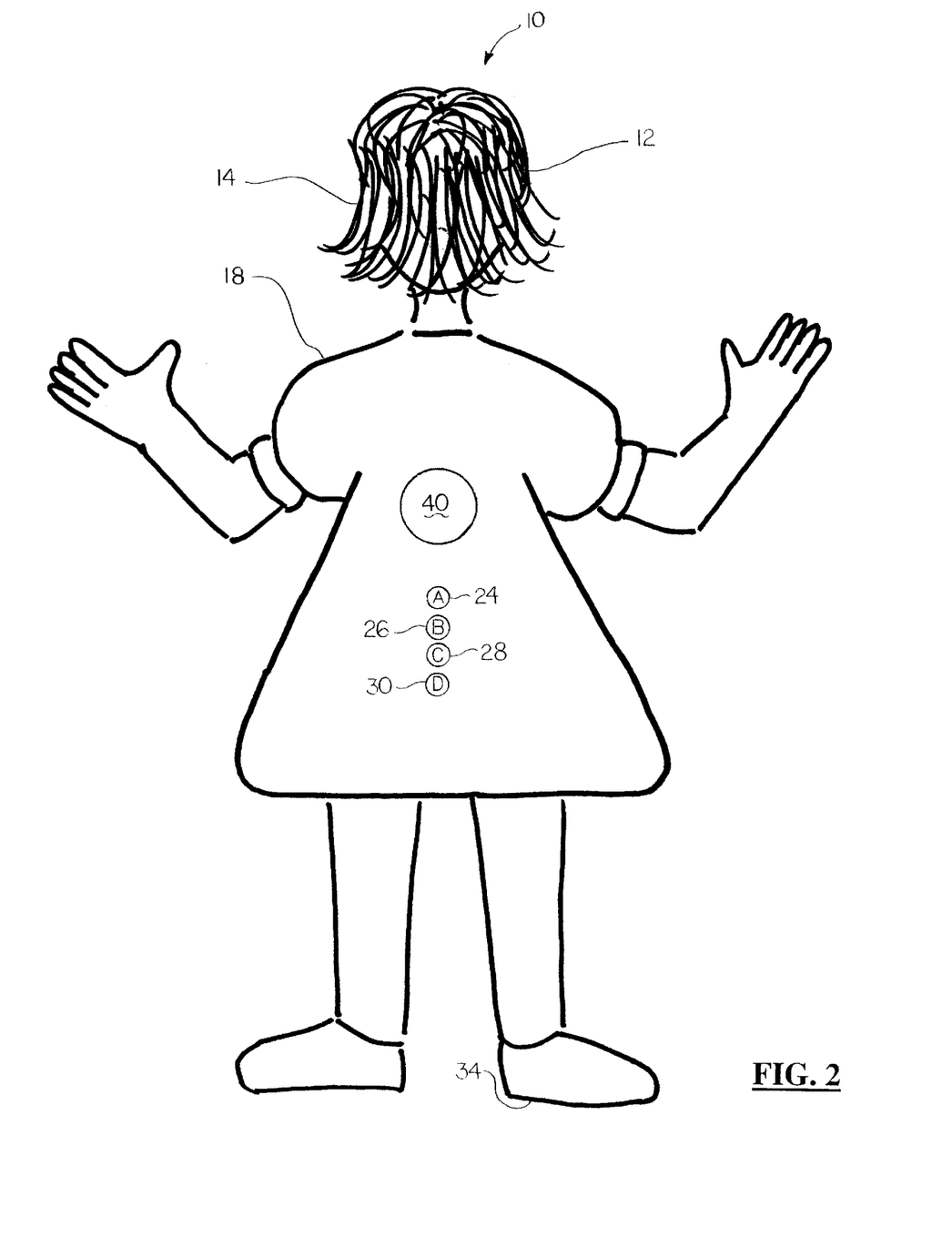
FIG. 2 is a rear elevational view of the enclosure of the vocal training device in the form of a doll-shaped figure.

FIG. 2 illustrates the rear of the doll shaped embodiment of present invention 10, which contains a multi-position switch 40 for selecting a desired song to be played back. This switch 40 may be comprised of any device suitable for selecting among a plurality of pre-formatted songs.

Figure 3:
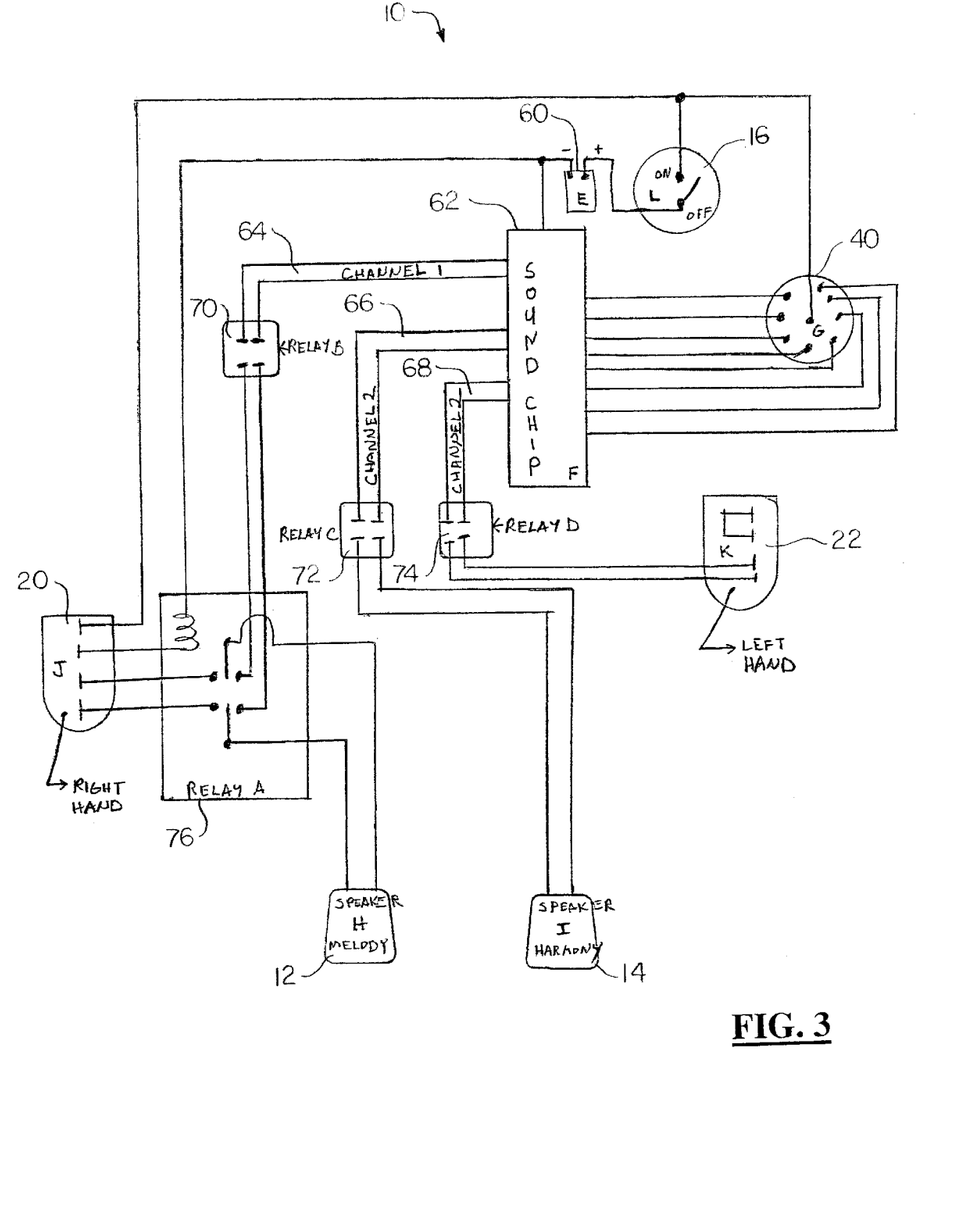
FIG. 3 is a schematic illustration of the electronic circuit that provides the melody and harmony playback function of the present invention.

Turning now to FIG. 3, a schematic diagram of the electronic circuit for playing back the melody and/or harmony of a song represents an embodiment of the invention. To activate the voice training system 10, the user puts ON/OFF switch 16 into the "ON" position. The user then uses a multi-position switch 40 to select among a plurality of predetermined songs stored on a sound chip 62. The songs stored on the sound chip 62 are preformatted so that the melody, harmony and/or the harmony's sub-components can be separately played back.

Once a song is selected, the user selects a desired playback mode by actuating a play back mode switch which is comprised of a plurality of switches 24,26, 28, and 30 as shown in FIG. 1. These switches 24, 26, 28, and 30 may be comprised of pushbutton switches, rotary switches, slider switches or any other type of devices suitable for selecting among a plurality of playback options. If playback of only the melody is desired, the user activates a switch 24 to close relay B at 70. Once activated, the present invention 10 is put into its default playback setting, and normally closed contacts of relay A at 76 remain closed, while normally open contacts of relay B at 70 close. As a result, only the melody of the selected song is played through speaker 12, via channel 1 at 64. If the user of the present invention desires to play only the harmony portion of the song, the user activates switch 26 to close relay C at 72. Once contacts of relay C close, normally open contacts of relay B at 70 remain open, thereby allowing playback of only the harmony portion of the selected song through speaker 14, via channel 2 at 66. Furthermore, if the user desires to playback both the harmony and melody of a song simultaneously, the user activates switch 28. Activating switch 28 causes normally open contacts of relay C at 72 to become closed as well as contacts of relay B at 70 to close, thereby allowing playback of the harmony through a speaker 14. Additionally, normally open contacts of relay B at 70 close, and normally closed contacts of relay A at 76 continue to remain closed, thereby allowing the melody to be played back through a speaker 12.

A further option presented to the user of the vocal training device 10 includes, allowing a user to attach a second training device's processing circuit to a first training device's circuit through a plurality of connectors 20, 22. Additionally, any connectors that allow electrical circuits to be connected can be used, and are widely known in the art. It is also contemplated that a connecting cable or other similar means for connecting a plurality of electrical circuits known in the art may be used to connect a first and a second training units' processing circuit. By connecting a first and second circuit together, the first training device 10 is able to act as a "master" while the second training device 10 acts as a "slave." By having the first and second vocal training devices 10 in a master/slave configuration, the present invention 10 is capable of playing the melody through channel 1 at 64 via speaker 12 in a first training unit 10 and the harmony through channel 2 at 68 via a speaker 12 located in a second connected training device 10. To create this master/slave configuration, the user couples a corresponding connector 20 of a second training unit into the corresponding connector 20 of a first training unit. Once the units are connected together, the user can initiate playback of the melody on a first vocal training device 10 and playback of harmony on a second vocal training device 10 by selecting button 30 on the first unit (master), thereby closing relay D at 74 and relay B at 70 on the first unit 10 (the master). As a result of this action, the "master" or first unit 10, is capable of sending the harmony portion of the selected song via channel 2 at 68 to the second unit or "slave" to be played back via the speaker 12 located on the second unit.

Figure 4:
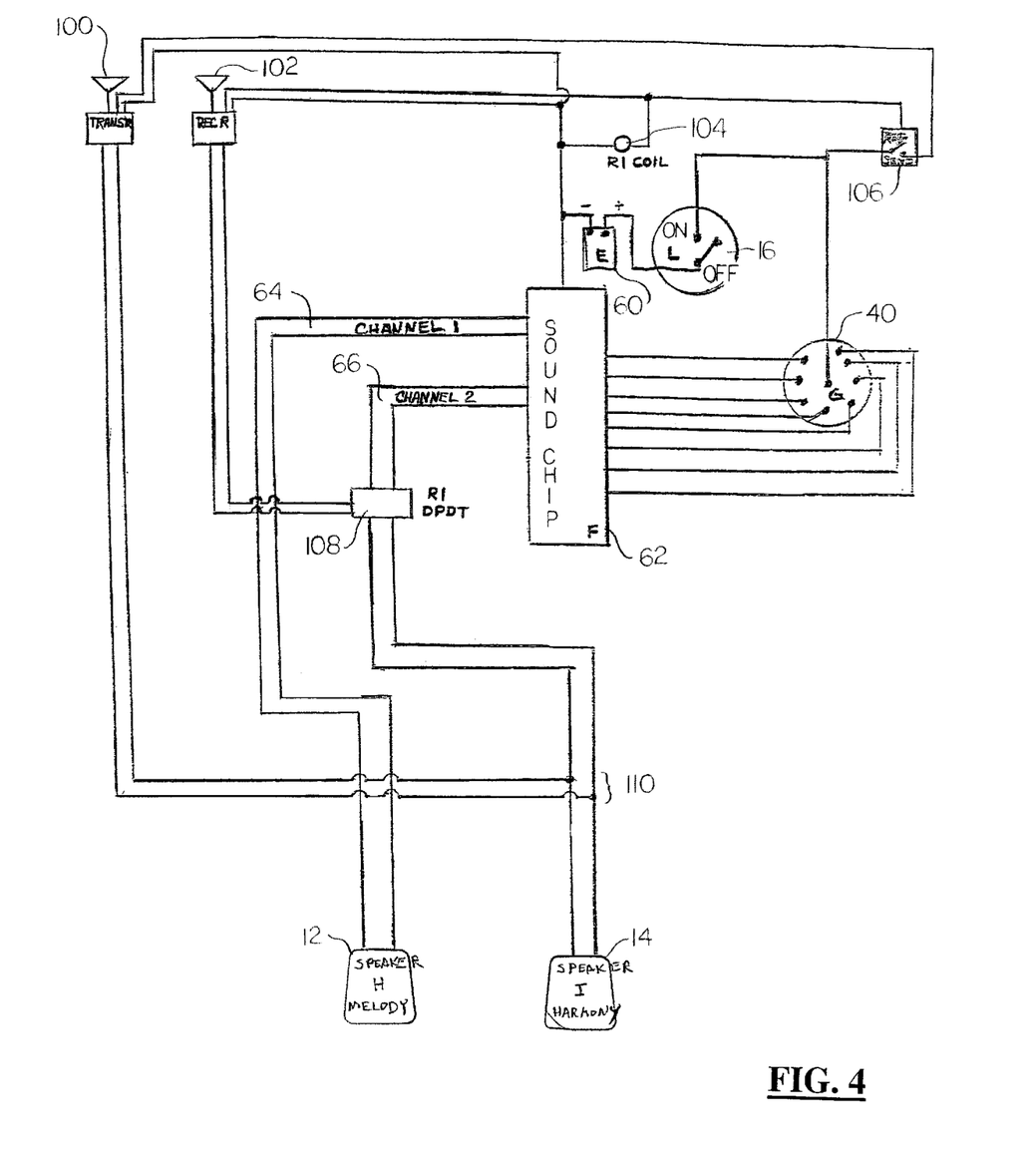
FIG. 4 is a schematic illustration of a further embodiment of the vocal training device which utilizes a wireless transmitter/receiver to connect a plurality of training devices together, thereby allowing the harmony and melody components of a song to be played back among the connected units.

FIG. 4 illustrates a further embodiment of the present invention 10 which utilizes a wireless transmitter 100 and receiver 102 to allow multiple voice training devices 10 to be linked together. By linking multiple training units together, the harmony and/or melody components of a song can be and played back without physically attaching the voice training units 10 together. This ability allows the user to customize the position of the training units 10 according to acoustic considerations of the room where the training units 10 are being used, thereby enhancing the separation among the melody and harmony components. To initiate the present invention 10 in its wireless embodiment, the user sets the send/receive mode switch 106 into either the send or receive position. If the user selects the send position, the unit becomes a "master" and the transmitter 100 is activated, and double pole double throw relay 108 is positioned so the harmony that is played over channel 2 at 66 is directed to connection terminals 110. As a result, the harmony is transmitted to another vocal training device 10 or "slave" via transmitter 100.

If the user places send/receive mode switch 106 into the receive position, the unit 10 becomes a "slave" and the receiver 102 is activated, and relay coil 104 is activated which bypasses the sound chip 62 and multi-position switch 40. Double pole double throw relay 108 is re-positioned so that channel 2 at 66 of the bypassed sound chip 62 is deactivated, thereby connecting the receiving unit's receiver 102 to speaker 14. As a result, the harmony portion of the selected song is transmitted from the "master", and is received and played back by the "slave" via speaker 80. It should be noted that only the harmony is being transmitted to the slave, therefore melody will not be played by the slave while it is playing harmony.

A further embodiment of the present invention 10 further allows the vocal training unit 10 to playback multiple part harmonies. Specifically, a song can be pre-formatted to play a 4-part harmony comprising a soprano, alto, tenor, and bass for playback via the vocal training system 10. The present invention also contemplates the playback of songs that contain further sub-components of harmony such as baritone, and contralto. Additionally, the user can configure the training units 10 so that a plurality of connected training units 10 play back only a specific component of the harmony such as the alto, or tenor portions. For example, if a 4-part harmony is being played, the user can have a first training unit 10 act as the "master" where it would play the melody (soprano), and a second group of training units play the harmony components comprising the alto, tenor, and bass with each component individually played on 4 separate vocal training units 10 respectively. It is also contemplated that the present invention 10 could play only one or any combination of the melody, and harmony components (soprano, alto, tenor, and bass) at a given time. For example, the user could configure the present invention 10 to play only the alto portion of the selected song, or play only the melody of the song.

A further embodiment of the present invention is also contemplated, whereby vocal training units 10 can be linked to a computer network, such as the internet. Once the vocal training unit 10 is connected to the computer network, the unit 10 is capable of downloading, preformatted songs configured for playing back the discrete harmony and melody components of the selected song. After the songs are downloaded, they may be stored in the unit 10 via random access memory fixed within the unit 10, or the songs can be transferred to a portable/removable storage device, such as a flash memory card. However, other forms of storage could be used to store the downloaded songs, such as a recordable floppy disc system, a recordable Mini Disc System (MD), a CD-R/RW system or any other type of recordable media suitable for storing songs for later playback. By allowing the user to connect to a computer network, the user has the opportunity to access a large number of songs in which he can choose and learn from.

Use of solid state logic is also contemplated, whereby the relay switch logic is replaced with a microprocessor control unit, allowing the microprocessor to control the playback modes of the present invention 10.

The foregoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A vocal training system comprising:
    a means for selecting a desired song to be played back;
    a means for selecting a desired playback mode;
    a means for storing a preformatted song, whereby the song is comprised of a plurality of components, having at least one melody component, and at least one harmony component; and
    a means for playing back the selected melody and harmony components of the desired song.

2. A vocal training system as recited in claim 1, wherein the means for selectively playing back comprises the doll containing at least two speakers, one speaker playing one selected component, the other speaker playing a different selected component.

3. A vocal training system as recited in claim 1, further comprising the doll containing a means for receiving from another doll and a means for transmitting to an other doll.

4. A vocal training system as recited in claim 2, further comprising a system for connecting a plurality of vocal training systems together, thereby allowing a first connected training system to playback preselected portions of a song's harmony or melody through a second plurality of connected training systems.

5. A vocal training system as recited in claim 4, wherein the playback mode selection system allows a user to playback the discrete melody and harmony components in a desired configuration via a plurality of connected vocal training units.

6. A vocal training system as recited in claim 5, wherein the connecting system allows a user to connect a plurality of training systems together via a connecting cable.

7. A vocal training system as recited in claim 5, wherein the connecting system comprises a wireless communications system thereby allowing a plurality of training systems to wirelessly transfer or receive harmony and/or melody portions of a selected song, whereby selected components of the harmony and/or melody are received and played back on dedicated training units.

8. A vocal training device as recited in claim 2, further comprising a removable data storage system.

9. A vocal training device as recited in claim 2, further comprising a system capable of downloading a plurality of preformatted songs from a computer network.

10. A vocal training devices as recited in claim 2, wherein the selected son is formatted for playback of a four-part harmony comprising: soprano, alto, tenor, and bass portions of the song.

11. A method for learning to sing the melody and/or harmony of a song comprising the steps of:
    selecting a pre-formatted song to be played back on a first playback unit;
    selecting a desired playback mode on the first playback unit from the group consisting of melody only, harmony only, melody and harmony, sub-components of harmony, and sub-components of harmony with melody; and
    playing back the selected components of the song, thereby allowing the user to learn how to sing the desired harmony/melody portion of the selected song.

12. A method for learning to sing the melody and/or harmony of song as recited in claim 11, further comprising the steps of:

connecting a plurality of playback units using a plurality of connectors disposed on the plurality of playback units, whereby each user selected component of the harmony and/or melody is capable of being discretely played back via individually dedicated playback units.

13. A method for learning to sing the melody and/or harmony of a song as recited in claim 11, further comprising the steps of:

placing only a single training unit in a transmit mode;

placing at least one training unit in a receiving mode, whereby the receiving unit is capable of wirelessly receiving the melody, harmony, or harmony subcomponents that are transmitted by the transmitting unit; and playing back the melody, harmony, and/or the subcomponents of the harmony via a plurality of speakers located on a plurality of training units.

* * * * *

UNITED STATES PATENT AND TRADEMARK OFFICE
CERTIFICATE OF CORRECTION

PATENT NO. : 6,617,503 B2
DATED : September 9, 2003
INVENTOR(S) : Geopfert, Joseph W.

It is certified that error appears in the above-identified patent and that said Letters Patent is hereby corrected as shown below:

Replace the title page and specification with the attached.

Signed and Sealed this

Twenty-third Day of May, 2006

JON W. DUDAS
*Director of the United States Patent and Trademark Office*

(12) United States Patent
Geopfert (10) Patent No.: US 6,617,503 B2
(45) Date of Patent: Sep. 9, 2003

(54) VOCAL TRAINING DEVICE

(76) Inventor: Joseph W. Geopfert, 1961 Marhofer Ave., Stow, OH (US) 44224

( * ) Notice: Subject to any disclaimer, the term of this patent is extended or adjusted under 35 U.S.C. 154(b) by 0 days.

(21) Appl. No.: 09/943,472

(22) Filed: Aug. 30, 2001

(65) Prior Publication Data

US 2003/0041720 A1 Mar. 6, 2003

(51) Int. Cl.⁷ .................................................. G10G 3/00
(52) U.S. Cl. .......................................... 84/461; 84/470 R
(58) Field of Search ...................... 84/461, 466, 470 R; 434/318

(56) References Cited

U.S. PATENT DOCUMENTS

| | | | |
|---|---|---|---|
| 3,584,530 A | * | 6/1971 | Andersen .................. 84/470 R |
| 3,634,596 A | * | 1/1972 | Rupert ........................ 360/12 |
| 3,955,466 A | * | 5/1976 | Goldmark .................. 360/74.4 |
| 4,169,335 A | | 10/1979 | Betancourt |
| 4,321,853 A | | 3/1982 | Tumblin |
| 4,441,399 A | * | 4/1984 | Wiggins et al. ........... 84/470 R |
| 4,828,527 A | | 5/1989 | Spector |
| 4,840,602 A | | 6/1989 | Rose |
| 4,857,030 A | | 8/1989 | Rose |
| 4,949,327 A | | 8/1990 | Forsse et al. |
| 5,052,264 A | * | 10/1991 | Dueweke .................. 84/470 P |
| 5,096,451 A | | 3/1992 | Smith et al. |
| 5,281,143 A | | 1/1994 | Arad et al. |
| 5,287,789 A | | 2/1994 | Zimmerman |
| 5,376,038 A | | 12/1994 | Arad et al. |
| 5,438,154 A | | 8/1995 | Segan et al. |
| 5,439,382 A | * | 8/1995 | Pettinichi .................... 434/319 |
| 5,518,408 A | * | 5/1996 | Kawashima et al. .... 434/307 A |
| 5,525,062 A | * | 6/1996 | Ogawa et al. ................. 386/96 |
| 5,540,132 A | | 7/1996 | Hale |
| 5,563,358 A | | 10/1996 | Zimmerman |
| 5,603,652 A | | 2/1997 | Rothschild et al. |
| 5,636,994 A | | 6/1997 | Tong |
| 5,655,945 A | | 8/1997 | Jani |
| 5,820,440 A | | 10/1998 | Truchsess |
| 5,855,483 A | | 1/1999 | Collins et al. |
| 5,897,421 A | | 4/1999 | Rink et al. |
| 5,906,494 A | * | 5/1999 | Ogawa et al. .......... 434/307 A |
| 5,944,533 A | | 8/1999 | Wood |
| 6,000,987 A | | 12/1999 | Belin et al. |
| 6,057,501 A | | 5/2000 | Hale |
| 6,135,845 A | | 10/2000 | Klimpert et al. |
| 6,160,986 A | | 12/2000 | Gabai et al. |
| 6,183,337 B1 | | 2/2001 | Beckman et al. |
| 6,414,229 B1 | * | 7/2002 | Gaudet ........................ 84/465 |

FOREIGN PATENT DOCUMENTS

JP 4-322686 11/1992

* cited by examiner

*Primary Examiner*—Jeffrey Donels
(74) *Attorney, Agent, or Firm*—Hahn Loeser & Parks LLP; Michael H. Minns (57) ABSTRACT

The present invention relates to a system for playing back, via a plurality of speakers, the melody, harmony, and the harmony's components which comprise a song. Specifically, the present invention allows the user to select a song from a plurality of songs that have been formatted to allow playback of individual melody and/or harmony or the harmony's sub-components. Additionally, the present invention allows the user to select a desired playback mode which includes: melody only, harmony only, melody and harmony, multi-unit playback of melody, harmony and harmony's components.

13 Claims, 4 Drawing Sheets

VOCAL TRAINING DEVICE

TECHNICAL FIELD

The present invention relates generally to an apparatus for teaching individuals musical harmony and how to vocally reproduce the harmony and/or melody of a prerecorded/preformatted song. Specifically, the present invention involves the use of a single unit or multiple units to playback the harmony component and/or the melody component (and/or sub-components) of a preselected song. As a result, the user of the present invention is able to listen and more effectively discern the discrete harmony and/or melody components of a song, thereby serving as an entertaining device and/or training a user to sing the song's harmony and/or melody.

BACKGROUND OF THE INVENTION

Learning or teaching another how to vocally reproduce or sing the harmony and/or melody of a song can be a tedious and time consuming undertaking, generally requiring the expense of a voice coach or singing instructor. Furthermore, without costly equipment, an untrained listener would likely have difficulty separating a song's harmony and/or melody from a tune heard over the radio, stereo, or any other mode of audio playback. A standard song comprises a melody, which typically contains the words of the song as expressed through a singer's voice, and one or more harmony parts that are comprised of an accompanying singing voice or a plurality of singing voices. Additionally, the harmony of a song may be further classified into sub-classifications based upon the pitch of the singer's voice that include: soprano, alto, tenor, bass. Furthermore, it is also widely known in the art of music that these harmony sub-classifications can be further defined by additional sub-classifications, such as baritone and contralto.

More specifically, the harmony of a song is based on the sound and interrelationship between various pitches of a plurality of voices as they sound when they are simultaneously sung (played) together. Further, harmony is comprised of a plurality of sub-categories corresponding to the pitch of a person's voice with respect to that of another person's voice. A soprano in general is the highest human voice, however other levels of voice exist. Generally, an alto voice is the lowest of the female voices and is the voice range found between the soprano voice, and the tenor voice. The tenor voice is typically the highest normal register of a male. Finally, the lowest register of a human voice is the bass, and is typically sung by a male.

The melody, on the other hand is generally regarded as being the "tune" of a piece of music. Additionally, a melody is created when pitches or notes of a song are structured in succession with each other so as to make an integrated whole.

At present, there are no simple and effective methods or products for facilitating a greater understanding of melody and harmony characteristics and/or to facilitate teaching of these relationships.

Therefore, in light of the foregoing deficiencies in the prior art, the applicant's invention is herein presented.

SUMMARY OF THE INVENTION

It is an object of the present invention, or vocal training device, to facilitate an individual's ability to learn how to vocally reproduce the harmony and/or melody of a prerecorded song. It is an additional object of the present invention to provide a system to allow the user to better understand how the melody and harmony components of a song interact and complement each other. A further objective of the present invention is to provide a system that is simple and cost effective, and appealing to the user. One embodiment of the present invention is comprised of a housing, an electrical circuit for playing back a stored predetermined melody or harmony of a song, a playback mode selector switch, a song selection switch, and a plurality of speakers. The housing may be of any configuration, and in one embodiment may be suitable for use by children, such as being doll-like in form. Any other housing or configuration suitable for enclosing an electrical circuit may be used. To initiate playback of a song, the user actuates a selector switch to select a desired song stored in the electrical circuit's memory for playback. These songs are preformatted so that the melody, harmony and harmony's associated sub-components including: soprano, alto, tenor, and bass, etc. can be played back as separate, discrete channels via individually dedicated speakers. Next, the user actuates a playback mode selector switch to initiate the unit's playback options which may comprise the following: playback of the melody and harmony simultaneously, playback of the melody only, playback of the harmony only, or playback of the melody and harmony through separate interacting training units respectively.

Additionally, the present invention may include a system for coupling a plurality of vocal training units together via a connecting system. In an embodiment of the present invention, the training units can be physically linked together or linked wirelessly via a transmitter/receiver system located in each training unit. By linking a plurality of vocal training devices together, the present invention will allow the user to playback the melody, harmony, or specific sub-components of the harmony (soprano, alto, tenor, bass) separately through individual speakers located within each of the connected vocal training devices.

SUMMARY OF THE DRAWINGS

FIG. 1 is a front elevational view of the enclosure of the vocal training device in the form of a doll-shaped figure.

FIG. 2 is a rear elevational view of the enclosure of the vocal training device in the form of a doll-shaped figure.

FIG. 3 is a schematic illustration of the electronic circuit that provides the melody and harmony playback function of the present invention.

FIG. 4 is a schematic illustration of a further embodiment of the vocal training device which utilizes a wireless transmitter/receiver to connect a plurality of training devices together, thereby allowing the harmony and melody components of a song to be played back among the connected units.

DETAILED DESCRIPTION

The present invention 10, or vocal training device 10 is described in FIG. 1. In a configuration, the vocal training device 10 is comprised of a housing 18 in the form of a doll-like figure. However, this shape is not necessary for the function of the present invention 10, and any structure suitable for housing an electrical circuit can be used. This or like shapes may be more aesthetically pleasing for certain users, such as children. The present invention 10 is comprised of a plurality of speakers 12,14 with each individual speaker dedicated to playing back either the harmony and/or melody of a song. It is also contemplated that additional speakers may be added to allow discrete playback of the sub-components (soprano, alto, tenor, bass) of the harmony via individually dedicated speakers. By having separate speakers for each component of the harmony and melody, the present invention 10 allows the user to more easily discern the harmony and/or melody of a song. A switch 16 allows the user to activate and deactivate the vocal training device 10. To select a desired playback mode, the user must select a corresponding selection button 24, 26, 28, and 30. Additionally, it is contemplated that a variety of switching devices or switching configurations known in the art may be used to select a playback mode or to deactivate/activate the present invention 10. By selecting one of the buttons, 24, 26, 28, and 30 the present invention 10 will playback the melody and/or harmony in one of the following possible playback configurations: the melody only, the harmony only, the harmony and melody combined, and playback where the harmony is played through a first voice training device 10 and the melody is played back through a second voice training device 10 that is connected to the first voice training device 10. It is also contemplated that other possible playback configurations can be adopted, such as having the harmony's sub-components (soprano, alto, tenor, bass, etc.) individually selected for playback as well. A plurality of connectors 20,22 widely known in the art are situated on the palms of the doll's hands, and allow the user of the present invention 10 to link the circuits of additional voice training devices 10 together. Additionally, these connectors 20,22 could be located in any position on the training device that is suitable for linking a plurality of training devices 10 together. By connecting additional circuits, the present invention 10 is capable of playing back the melody and the harmony, the harmony's components (soprano, alto, tenor, bass) or other harmonic or melodic parts on separate voice training units 10. By having the melody play from one voice training unit 10, and the harmony playing from a second voice training unit 10 connected through connectors 20, 22, the user is able to easier identify the separate musical parts, but it may be possible to play back multiple parts on the plurality of units 10. Finally, the present invention operates using the power of a battery 60 stored in the battery enclosure 34, however it is also contemplated that any external AC/DC power source may be used to operate the present invention 10.

FIG. 2 illustrates the rear of the doll shaped embodiment of present invention 10, which contains a multi-position switch 40 for selecting a desired song to be played back. This switch 40 may be comprised of any device suitable for selecting among a plurality of pre-formatted songs.

Turning now to FIG. 3, a schematic diagram of the electronic circuit for playing back the melody and/or harmony of a song represents an embodiment of the invention. To activate the voice training system 10, the user puts ON/OFF switch 16 into the "ON" position. The user then uses a multi-position switch 40 to select among a plurality of predetermined songs stored on a sound chip 62. The songs stored on the sound chip 62 are preformatted so that the melody, harmony and/or the harmony's sub-components can be separately played back.

Once a song is selected, the user selects a desired playback mode by actuating a play back mode switch which is comprised of a plurality of switches 24,26, 28, and 30 as shown in FIG. 1. These switches 24, 26, 28, and 30 may be comprised of pushbutton switches, rotary switches, slider switches or any other type of devices suitable for selecting among a plurality of playback options. If playback of only the melody is desired, the user activates a switch 24 to close relay B at 70. Once activated, the present invention 10 is put into its default playback setting, and normally closed contacts of relay A at 76 remain closed, while normally open contacts of relay B at 70 close. As a result, only the melody of the selected song is played through speaker 12, via channel 1 at 64. If the user of the present invention desires to play only the harmony portion of the song, the user activates switch 26 to close relay C at 72. Once contacts of relay C close, normally open contacts of relay B at 70 remain open, thereby allowing playback of only the harmony portion of the selected song through speaker 14, via channel 2 at 66. Furthermore, if the user desires to playback both the harmony and melody of a song simultaneously, the user activates switch 28. Activating switch 28 causes normally open contacts of relay C at 72 to become closed as well as contacts of relay B at 70 to close, thereby allowing playback of the harmony through a speaker 14. Additionally, normally open contacts of relay B at 70 close, and normally closed contacts of relay A at 76 continue to remain closed, thereby allowing the melody to be played back through a speaker 12.

A further option presented to the user of the vocal training device 10 includes, allowing a user to attach a second training device's processing circuit to a first training device's circuit through a plurality of connectors 20, 22. Additionally, any connectors that allow electrical circuits to be connected can be used, and are widely known in the art. It is also contemplated that a connecting cable or other similar means for connecting a plurality of electrical circuits known in the art may be used to connect a first and a second training units' processing circuit. By connecting a first and second circuit together, the first training device 10 is able to act as a "master" while the second training device 10 acts as a "slave." By having the first and second vocal training devices 10 in a master/slave configuration, the present invention 10 is capable of playing the melody through channel 1 at 64 via speaker 12 in a first training unit 10 and the harmony through channel 2 at 68 via a speaker 12 located in a second connected training device 10. To create this master/slave configuration, the user couples a corresponding connector 20 of a second training unit into the corresponding connector 20 of a first training unit. Once the units are connected together, the user can initiate playback of the melody on a first vocal training device 10 and playback of harmony on a second vocal training device 10 by selecting button 30 on the first unit (master), thereby closing relay D at 74 and relay B at 70 on the first unit 10 (the master). As a result of this action, the "master" or first unit 10, is capable of sending the harmony portion of the selected song via channel 2 at 68 to the second unit or "slave" to be played back via the speaker 12 located on the second unit.

FIG. 4 illustrates a further embodiment of the present invention 10 which utilizes a wireless transmitter 100 and receiver 102 to allow multiple voice training devices 10 to be linked together. By linking multiple training units together, the harmony and/or melody components of a song can be and played back without physically attaching the voice training units 10 together. This ability allows the user to customize the position of the training units 10 according to acoustic considerations of the room where the training units 10 are being used, thereby enhancing the separation among the melody and harmony components. To initiate the present invention 10 in its wireless embodiment, the user sets the send/receive mode switch 106 into either the send or receive position. If the user selects the send position, the unit becomes a "master" and the transmitter 100 is activated, and double pole double throw relay 108 is positioned so the harmony that is played over channel 2 at 66 is directed to connection terminals 110. As a result, the harmony is transmitted to another vocal training device 10 or "slave" via transmitter 100.

If the user places send/receive mode switch 106 into the receive position, the unit 10 becomes a "slave" and the receiver 102 is activated, and relay coil 104 is activated which bypasses the sound chip 62 and multi-position switch 40. Double pole double throw relay 108 is re-positioned so that channel 2 at 66 of the bypassed sound chip 62 is deactivated, thereby connecting the receiving unit's receiver 102 to speaker 14. As a result, the harmony portion of the selected song is transmitted from the "master", and is received and played back by the "slave" via speaker 80. It should be noted that only the harmony is being transmitted to the slave, therefore melody will not be played by the slave while it is playing harmony.

A further embodiment of the present invention 10 further allows the vocal training unit 10 to playback multiple part harmonies. Specifically, a song can be pre-formatted to play a 4-part harmony comprising a soprano, alto, tenor, and bass for playback via the vocal training system 10. The present invention also contemplates the playback of songs that contain further sub-components of harmony such as baritone, and contralto. Additionally, the user can configure the training units 10 so that a plurality of connected training units 10 play back only a specific component of the harmony such as the alto, or tenor portions. For example, if a 4-part harmony is being played, the user can have a first training unit 10 act as the "master" where it would play the melody (soprano), and a second group of training units play the harmony components comprising the alto, tenor, and bass with each component individually played on 4 separate vocal training units 10 respectively. It is also contemplated that the present invention 10 could play only one or any combination of the melody, and harmony components (soprano, alto, tenor, and bass) at a given time. For example, the user could configure the present invention 10 to play only the alto portion of the selected song, or play only the melody of the song.

A further embodiment of the present invention is also contemplated, whereby vocal training units 10 can be linked to a computer network, such as the internet. Once the vocal training unit 10 is connected to the computer network, the unit 10 is capable of downloading, preformatted songs configured for playing back the discrete harmony and melody components of the selected song. After the songs are downloaded, they may be stored in the unit 10 via random access memory fixed within the unit 10, or the songs can be transferred to a portable/removable storage device, such as a flash memory card. However, other forms of storage could be used to store the downloaded songs, such as a recordable floppy disc system, a recordable Mini Disc System (MD), a CD-R/RW system or any other type of recordable media suitable for storing songs for later playback. By allowing the user to connect to a computer network, the user has the opportunity to access a large number of songs in which he can choose and learn from.

Use of solid state logic is also contemplated, whereby the relay switch logic is replaced with a microprocessor control unit, allowing the microprocessor to control the playback modes of the present invention 10.

The foregoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A vocal training system comprising:
   a doll, the doll having associated therewith:
      a means for selecting a desired song to be played back;
      a means for selecting a desired playback mode;
      a means for storing a preformatted song, whereby the song is comprised of a plurality of components, having at least one melody component, and at least one harmony component; and
      a means for selectively playing back the melody and harmony components of the desired song.

2. A vocal training system as recited in claim 1, wherein the means for selectively playing back comprises the doll containing at least two speakers, one speaker playing one selected component, the other speaker playing a different selected component.

3. A vocal training system as recited in claim 1, further comprising the doll containing a means for receiving from another doll and a means for transmitting to another doll.

4. A vocal training system comprising:
   a system for selecting a desired song to be played back;
   a system for selecting a desired playback mode comprising playback of any desired component of melody, harmony, or sub-components of harmony;
   a system for storing a preformatted song, whereby the preformatted song is comprised of a plurality of melody, harmony, and harmony sub-components;
   a system for playing back the selected components of the desired song; and
   a system for connecting a plurality of vocal training systems together, thereby allowing a first connected vocal training system to playback preselected portions of a song's harmony or melody through at least one second connected vocal training systems, a second connected vocal training system receiving input from a first connected vocal training system for playing back the preselected portion of a song's harmony or melody.

5. A vocal training system as recited in claim 4, wherein the playback mode selection system allows a user to playback the discrete melody and harmony components in a desired configuration via a plurality of connected vocal training systems.

6. A vocal training system as recited in claim 5, wherein the connecting system allows a user to connect a plurality of vocal training systems together via a connecting cable.

7. A vocal training system as recited in claim 5, wherein the connecting system comprises a wireless communications system thereby allowing a plurality of vocal training systems to wirelessly transfer or receive at least one of harmony and melody portions of a selected song, whereby at least one of the selected components of the harmony and melody are received and played back on second vocal training systems.

8. A vocal training device as recited in claim 4, further comprising a removable data storage system.

9. A vocal training device as recited in claim 4, further comprising a system capable of downloading a plurality of preformatted songs from a computer network.

10. A vocal training devices as recited in claim 4, wherein the selected song is formatted for playback of a four-part harmony comprising:
   soprano, alto, tenor, and bass portions of the song.

11. A method for learning to sing the melody and/or harmony of a song comprising the steps of:

selecting a pre-formatted song to be played back on a first playback unit;

selecting a desired playback mode on the first playback unit from the group consisting of melody only, harmony only, melody and harmony, sub-components of harmony, and sub components of harmony with melody; and playing back from the first playback unit the selected components of the song, each selected component being played back through a separate speaker, thereby allowing the user to learn how to sing the desired portion of the selected song.

12. A method for learning to sing the melody and/or harmony of song as recited in claim 11, further comprising the steps of:

connecting a plurality of playback units using a plurality of connectors disposed on the plurality of playback units, whereby each user selected component of the song is capable of being discretely played back via individually dedicated playback units.

13. A method for learning to sing the melody and/or harmony of a song as recited in claim 11, further comprising the steps of:

placing only a single playback unit in a transmit mode, each playback unit being capable of transmitting and receiving;

placing at least one playback unit in a receiving mode, whereby the receiving unit is capable of wirelessly receiving the melody, harmony, or harmony sub-components that are transmitted by the transmitting unit; and playing back the user selected component of the song via a plurality of speakers located on a plurality of playback units.

* * * * *